United States Patent
Dennard et al.

(10) Patent No.: US 8,041,085 B2
(45) Date of Patent: Oct. 18, 2011

(54) MINUTIAE MASK

(75) Inventors: Mark D. Dennard, Kennesaw, GA (US);
Stephen E. Jaffe, Canton, GA (US);
Keith P. Loring, Milton, VT (US);
Michael P. Outlaw, Dallas, GA (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 12/030,407

(22) Filed: Feb. 13, 2008

(65) Prior Publication Data

US 2009/0202115 A1 Aug. 13, 2009

(51) Int. Cl.
*G06K 9/62* (2006.01)
(52) U.S. Cl. .......................................... 382/125
(58) Field of Classification Search .................. None
See application file for complete search history.

(56) References Cited

U.S. PATENT DOCUMENTS

| 4,582,985 | A  | * | 4/1986  | Lofberg     | 235/380 |
| 4,607,384 | A  | * | 8/1986  | Brooks      | 382/124 |
| 5,717,777 | A  | * | 2/1998  | Wong et al. | 382/124 |
| 6,546,122 | B1 | * | 4/2003  | Russo       | 382/125 |
| 7,068,824 | B2 | * | 6/2006  | Hara et al. | 382/125 |
| 7,260,246 | B2 | * | 8/2007  | Fujii       | 382/124 |
| 7,369,700 | B2 | * | 5/2008  | Neumann et al. | 382/181 |
| 7,711,153 | B2 | * | 5/2010  | Hillhouse   | 382/115 |
| 2004/0248589 | A1 | * | 12/2004 | Gwon et al. | 455/456.1 |
| 2006/0104484 | A1 | * | 5/2006  | Bolle et al. | 382/115 |
| 2006/0153431 | A1 |   | 7/2006  | Ando        |         |
| 2006/0159316 | A1 |   | 7/2006  | Chisamore et al. |    |
| 2008/0080750 | A1 | * | 4/2008  | Bee et al.  | 382/124 |

OTHER PUBLICATIONS

Bebis, George et al., "Fingerprint Identification Using Delaunay Triangulation", IEEE, 1999, p. 452-459.
Jia, Congzhi. et al., "A Fingerprint Minutiae Matching Approach Based on Vector Triangle Method and Ridge Structure", IEEE, 2004, p. 871-875.
Chen, Xinjian et al., "An Algorithm for Distorted Fingerprint Matching Based on Local Triangle Feature Set", IEEE, Transactions on Information Forensics and Security, vol. 1, No. 2, Jun. 2006, p. 169-177.
Liu, Ning et al., "A Fingerprint Matching Algorithm Based on Delaunay Triangulation Net", Proceedings of the 2005 The Fifth International Conference on Computer and Information Technology, IEEE, 2005.

\* cited by examiner

*Primary Examiner* — Brian Werner
(74) *Attorney, Agent, or Firm* — Anna Linne; Roberts Mlotkowski Safran & Cole, P.C.

(57) ABSTRACT

A system and method of authenticating fingerprints. A method of authenticating a fingerprint includes comparing a geometric shape of a scanned fingerprint to a corresponding geometric shape of a stored fingerprint. The geometric shape and the corresponding geometric shape are defined by vertices. The vertices are defined by minutiae points, while the vertices are spaced apart from the minutiae points.

25 Claims, 6 Drawing Sheets

MINUTIAE MASK

FIELD OF THE INVENTION

The present invention relates generally to authenticating fingerprints, and, more particularly, to authenticating fingerprints in transactions conducted using wireless communication.

BACKGROUND OF THE INVENTION

Financial institutions are presently investigating the gathering of financial data using wireless communications and a unique private key. In one example, a credit card company is using a wireless transaction system using RFID tags wherein the RFID tag is swiped across a payment scanner. More specifically, a consumer can tap or wave their RFID equipped cell phone at a point of sale (POS) terminal, and an RFID chip then transmits account and payment information to a terminal which is connected to the credit card payment network. The entire process is designed to take only a few seconds.

Critics of the RFID approach are concerned with security problems, particularly with determining who is paying for a transaction. That is, a POS terminal has no way of knowing if the credit card owner is the person using an RFID-equipped cell phone to make the purchase. This lack of authentication can lead to fraudulent purchases.

One way to authenticate transactions is through the use of biometrics, such as, for example, fingerprints, retinal scans, etc. Fingerprints, for example, contain minutiae points, which are defined as unique identification points on a fingerprint where a ridge of the fingerprint joins another ridge or the ridge simply ends. A gathered fingerprint may be compared to a stored fingerprint by comparing the minutiae points using known techniques.

A drawback of such an authentication scheme in a wireless environment, however, is that personal data (e.g., data pertaining to the retinal scan, fingerprint, etc.) is broadcast to any device within range of the wireless communication. For example, a POS terminal and a user's wireless device wirelessly transmit personal data (e.g., regarding the minutiae points of the scanned fingerprint and the saved fingerprint). A third-party device within the range of the transmissions could intercept and store the personal data (e.g., data regarding the minutiae points), which data could be used for identity theft.

Accordingly, there exists a need in the art to overcome the deficiencies and limitations described hereinabove.

SUMMARY OF THE INVENTION

In a first aspect of the invention, there is a method of authenticating a fingerprint including comparing a geometric shape of a scanned fingerprint to a corresponding geometric shape of a stored fingerprint. The geometric shape and the corresponding geometric shape are defined by vertices. The vertices are defined by minutiae points, while the vertices are spaced apart from the minutiae points.

In another aspect of the invention, there is a method of authenticating a fingerprint. the method includes scanning a fingerprint, determining minutiae points of the scanned fingerprint, and determining intersecting circles from the minutiae points of the scanned fingerprint. The method also includes creating at least one shape from intersection points of the intersecting circles; and transmitting the at least one shape to a device for comparison to a stored fingerprint.

In another aspect of the invention, there is a method for authenticating a fingerprint for authorizing a financial transaction. The method includes providing a computer infrastructure structured and arranged to: scan a fingerprint; determine minutiae points of the scanned fingerprint; create a minutiae mask based upon the minutiae points; create at least one shape from the minutiae mask; and transmit the at least one shape to a device for comparison to a stored fingerprint.

In another aspect of the invention, there is a computer program product comprising a computer usable medium having a computer readable program embodied in the medium. The computer readable program when executed on a computing device is operable to cause the computing device to: scan a fingerprint; determine minutiae points of the scanned fingerprint; determine intersecting circles from the minutiae points of the scanned fingerprint; create at least one shape from intersection points of the intersecting circles; and transmit the at least one shape to a device for comparison to a stored fingerprint.

BRIEF DESCRIPTION OF THE DRAWINGS

The present invention is described in the detailed description which follows, in reference to the noted plurality of drawings by way of non-limiting examples of exemplary embodiments of the present invention, in which.

DETAILED DESCRIPTION OF EMBODIMENTS OF THE INVENTION

The present invention relates generally to authenticating fingerprints, and, more particularly, to authenticating fingerprints in transactions conducted using wireless communication. In implementations of the invention, a mask is created that hides and protects the actual minutiae points. For example, in embodiments, circles are created from the minutiae points, and intersections of the circles serve as points that are used to create comparison triangles. In this manner, the circles and/or intersection points are transmitted for comparison, instead of the actual minutiae points. This serves to hide the actual minutiae points, thereby reducing the risk of such personal data falling into unauthorized hands.

One way to authenticate transactions is through the use of biometrics, such as, for example, fingerprints. For example, when a user attempts to make a purchase at a POS terminal, the user provides a fingerprint (e.g., via scanning) to the POS terminal. The user carries a wireless device (e.g., cell phone) that stores data relating to credit card information and a fingerprint associated with the credit card information. The POS terminal communicates wirelessly with the wireless device, comparing the minutiae points of the scanned fingerprint to minutiae points of the saved copy of the fingerprint stored in the wireless device. The comparison involves triangles formed by the minutiae points, and such comparison techniques are known such that further explanation is not believed necessary. If a threshold number of triangles are successfully matched, then the POS terminal is satisfied that the person who provided the scanned fingerprint is the same person whose fingerprint is associated with the credit card information stored in the phone, and the transaction is authorized.

Implementations of the invention provide for creating a minutiae mask that is used for comparing a gathered fingerprint to a stored fingerprint. The minutiae mask, however, does not contain data regarding the actual minutiae points of the fingerprint. In this manner, fingerprints may be authenticated using wireless communication without broadcasting data regarding the actual minutiae points.

Figure 1:
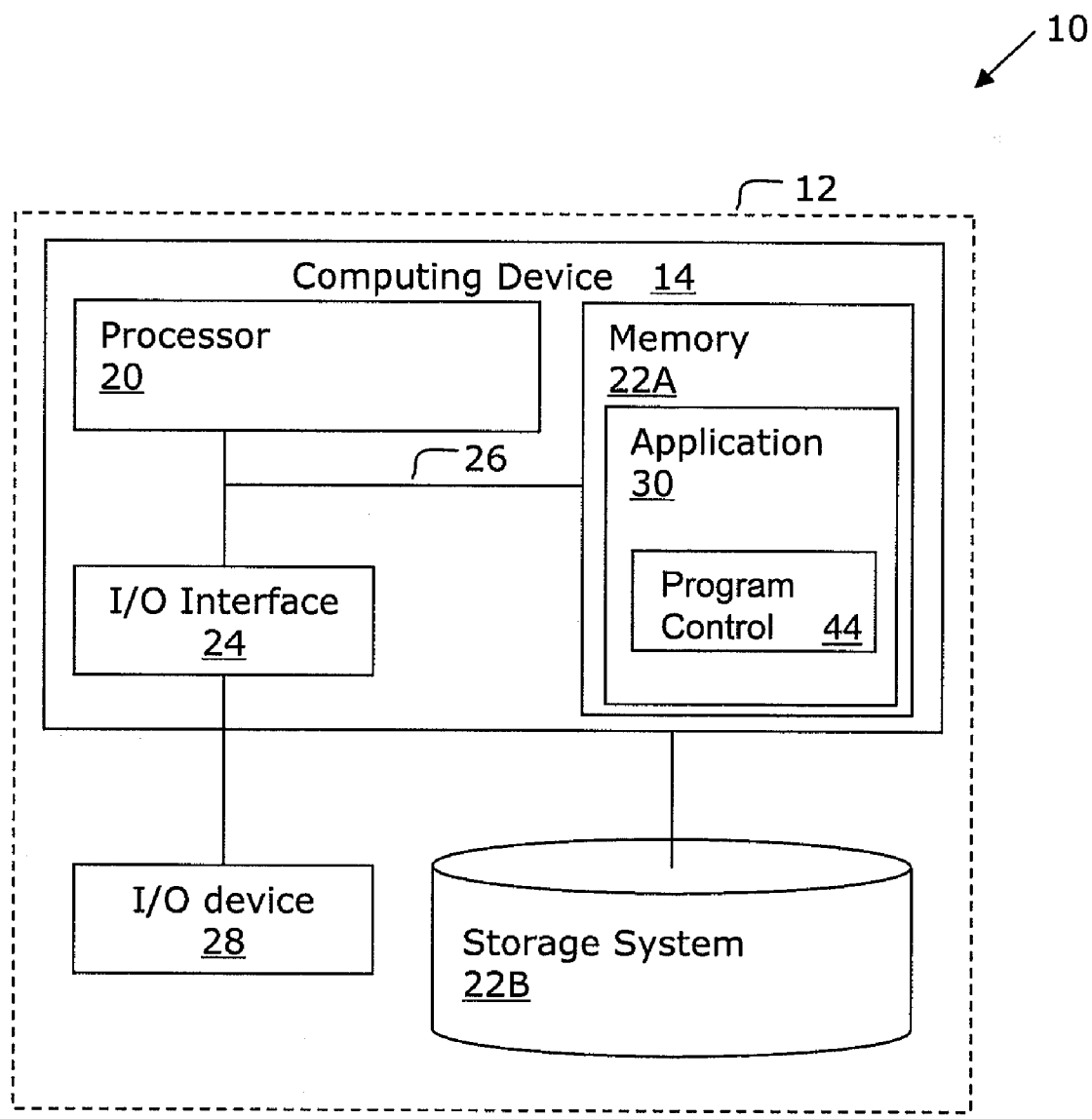
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes the computing device 14 operable to perform the processes described herein, such as, for example, creating a minutiae mask. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 44) in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code (e.g., program control 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to the computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or providing entity, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
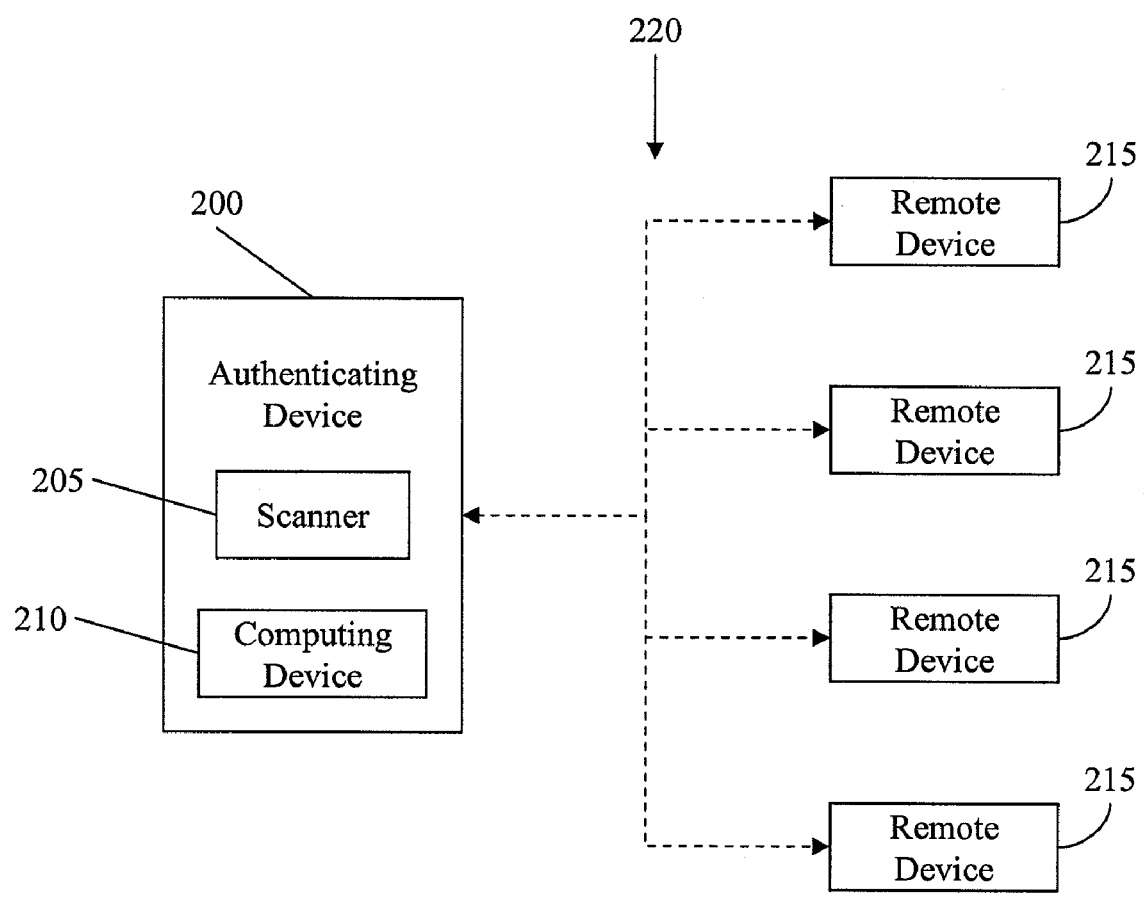
FIG. 2 shows a system according to aspects of the invention.

FIG. 2 shows a system for authenticating fingerprints according to aspects of the invention. The exemplary system is described with respect to a financial transaction in which fingerprints are authenticated via wireless communication between wireless computing devices; however, the invention is not limited to this described embodiments, but, rather, can be used in any environment where fingerprint authentication is desired. In embodiments, the system comprises a local authenticating device (AD) 200. The AD 200 may comprise, for example, a point of sale (POS) terminal having a fingerprint scanner 205. Fingerprint scanner 205 may include any conventional fingerprint scanner, such that further explanation is not believed necessary.

The AD 200 also comprises a computing device 210, such as that described with respect to FIG. 1. The computing device 210 is operatively connected to the fingerprint scanner 205, and is structured and arranged to utilize data from the fingerprint scanner 205 for authenticating fingerprints as described in processes disclosed herein. Additionally, the computing device 210 is structured and arranged to communicate wirelessly with at least one remote device 215. The wireless communication may be by any suitable wireless data transfer protocol, such as, for example, Bluetooth® (Bluetooth is a registered trademark BLUETOOTH SIG., INC. of Delaware).

Remote device 215 may comprise any suitable wireless computing device, such as, for example, a cell phone, personal digital assistant, laptop computer, etc., and may be implemented as described above with respect to FIG. 1. In embodiments, the remote device 215 comprises a combination of hardware and software that is structured and arranged to: store credit card information associated with a user, store fingerprint data associated with the credit card information, and utilize the stored fingerprint data for comparing to scanned fingerprint data from the AD 200, as described in processes disclosed herein.

As depicted in FIG. 2, there may be plural remote devices 215 within the wireless communication range of AD 200. Implementations of the invention allow the AD 200 to communicate with all remote devices 215 to identify which, if any, are associated with a fingerprint that matches the fingerprint scanned by fingerprint scanner 205. In embodiments, if a remote device 215 contains a fingerprint that is successfully authenticated against the fingerprint scanned by the fingerprint scanner 205, then that remote device may authorize the AD 200 to perform a financial transaction based upon credit card information stored in the remote device 215. Using such a system, a user may safely purchase articles by having their remote device (e.g., cell phone) on their person, and simply scanning their fingerprint at a POS terminal.

Figure 3:
FIGS. 3 and 4 show fingerprint data according to aspects of the invention.

FIG. 3 shows minutiae points 305 of a fingerprint. As used herein, a minutiae point is defined as a unique identification point on a fingerprint where a ridge of the fingerprint joins another ridge or the ridge ends. A typical fingerprint normally has between twenty and seventy minutiae points.

Figure 4:
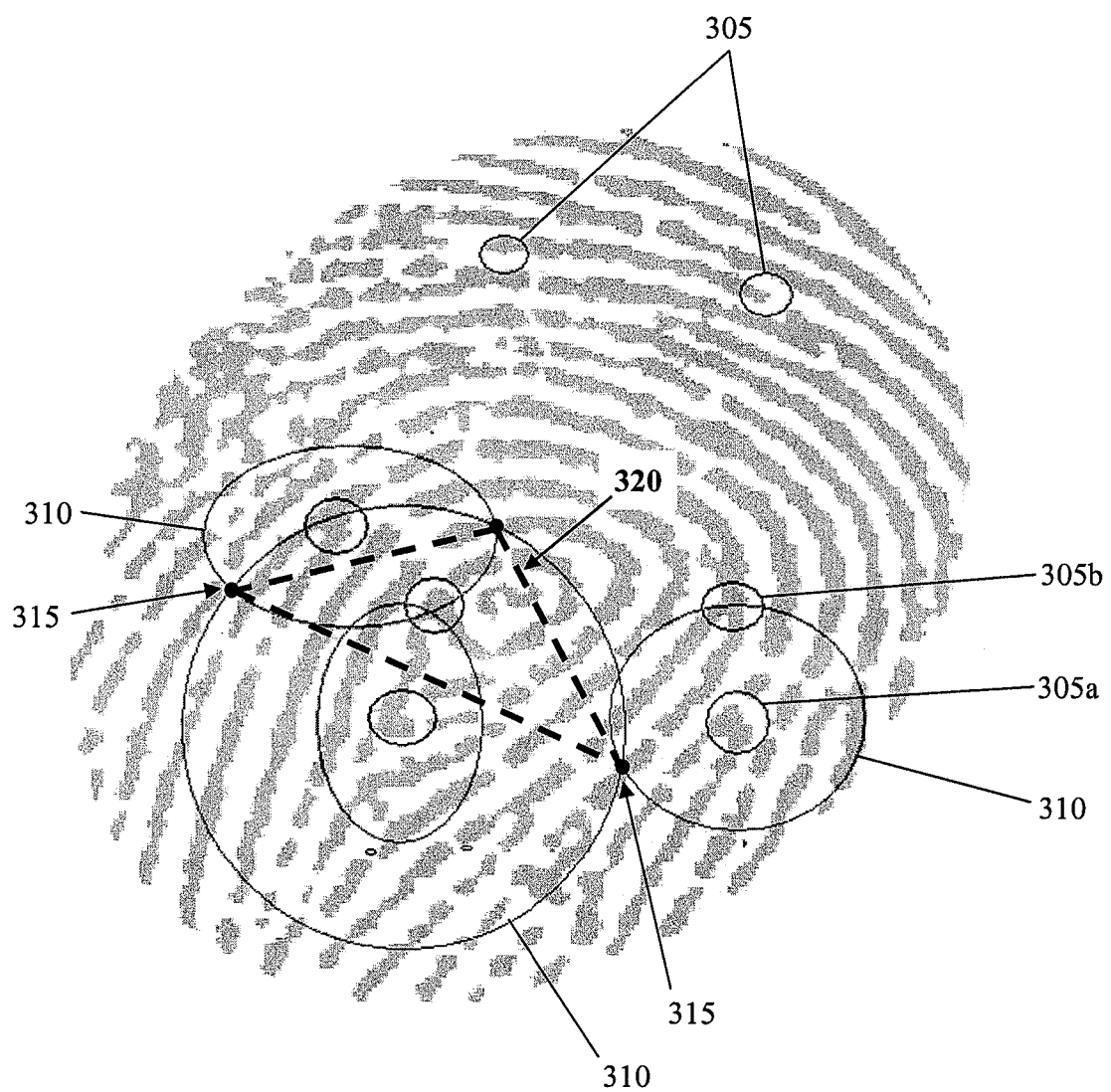

FIG. 4 shows the same fingerprint with circles 310 created from certain ones of the minutiae points 305. In embodiments, each circle 310 has a first minutiae point 305a at its center, and a radius defined by a line extending from the center to a second minutiae point 305b. As depicted in FIG. 4, the circles 310 create multiple intersection points 315, which are used according to aspects of the invention to generate geometric shapes for comparing fingerprints. For example, five intersecting circles can generate up to three hundred and sixty two triangles for comparison. Implementations of the invention create triangles 320 from the intersection points 315 for authenticating one fingerprint (e.g., a fingerprint scanned by fingerprint scanner 205) against another (e.g., a fingerprint stored in remote device 215). Such intersecting circles are referred to as a minutiae mask because they hide the identity of the actual minutiae points.

Processes of the Invention

The steps of the flow diagrams described herein may be implemented in the environment of FIG. 1, as well as in the system of FIG. 2. The flow diagrams may equally represent a high-level block diagram of the invention. The steps of the flow diagrams may be implemented and executed from a server, in a client-server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1 and the system of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
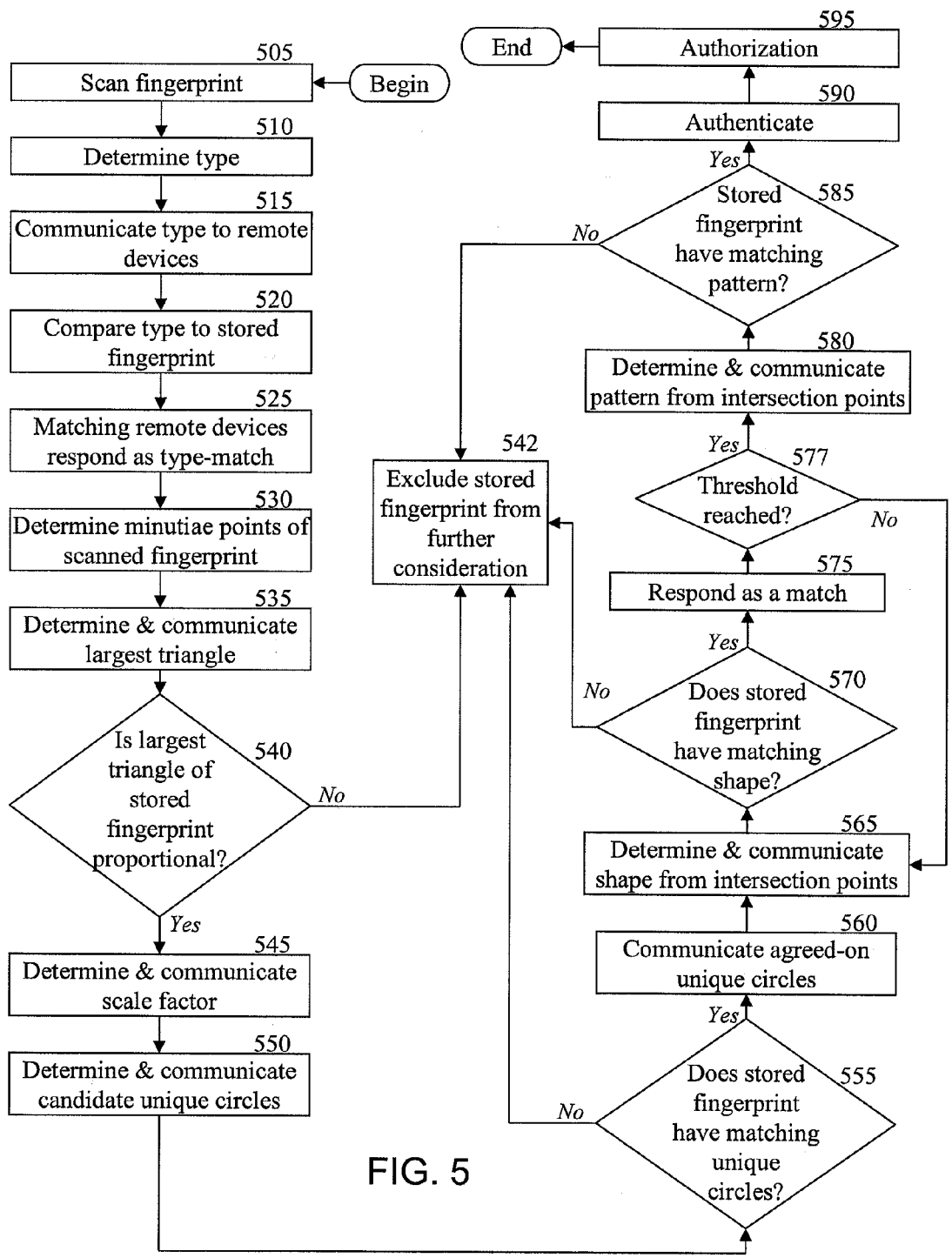
FIGS. 5 and 6 show flow diagrams depicting implementations of methods according to aspects of the invention.

FIG. 5 shows a flow diagram depicting steps of a first method for authenticating fingerprints according to aspects of the invention. At step 505, a finger print is scanned. In embodiments, this is performed at an authenticating device, such as that described above with respect to FIG. 2. For example, a purchaser wishing to purchase an item may provide a fingerprint scan at a POS terminal.

At step 510, the type of the fingerprint is determined. For example, a known fingerprint classification system classifies fingerprints as one of six possible types: arch, left or right loop, scar, tented arch, or whorl. Although these specific types are described, the invention is not limited to a classification using these types, and any suitable types may be used with the invention.

At step 515, a request for authenticating the scanned fingerprint, including the type of the scanned fingerprint, is broadcast from the authenticating device. In embodiments, this is accomplished using Bluetooth®, although any suitable wireless communication protocol may be used with the invention.

At step 520, each remote device that receives the broadcast from step 515 compares the scanned fingerprint type to a fingerprint stored in the remote device. At step 525, each remote device that has a stored fingerprint of the same type as the scanned fingerprint responds to the authenticating device that it is a type-match. This response, as with all subsequent communication between the authenticating device and any remote device(s), may also be performed via Bluetooth®, or according to any other suitable communication protocol.

It is noted that steps 510 through 525 are useful for increasing efficiency by quickly ruling out any non-matching remote devices according to fingerprint type. However, these steps are optional, and implementations of the invention may operate by proceeding from step 505 directly to step 530.

At step 530, the authenticating device determines the minutiae points of the scanned fingerprint. Determining minutiae points of a scanned fingerprint is known and can be performed using any conventional method, such that further explanation is not believed necessary. Once the minutiae points are determined, the authenticating device can also determine (e.g., via mathematical operation performed by software) a minutiae mask including circles and intersection points, such as those described above with respect to FIG. 4.

At step 535, the authenticating device transmits data defining the largest triangle that can be created from the minutiae points determined in step 530. In embodiments, the data defining the largest triangle includes angles and side lengths, but does not include any reference point to the scanned fingerprint. Put another way, the data merely defines the size and shape of a triangle, but does not define a minutiae point of the fingerprint. This data is transmitted to all candidate remote devices (e.g., those that responded as type matches in step 525, or, alternatively, all remote devices if steps 510-525 were not used).

At step 540, each candidate remote device that receives the data from step 535 compares the data to the largest triangle of the stored fingerprint. In embodiments, the comparison is of the angles of the triangles to determine if the triangles are proportional. If the remote device determines that its largest triangle from minutiae points is not proportional to the triangle received at step 535, then that remote device excludes itself from the pool of candidates at step 542 by not responding to the authenticating device, or by responding that it is no longer a candidate for authentication.

However, if a remote device determines that its largest triangle is proportional to the triangle from step 535, then the remote device determines a scale factor at step 545. The scale factor is a ratio of the size (e.g., total area, or length of one side) of the scanned fingerprint largest triangle to the stored fingerprint largest triangle. The scale factor is used for future comparisons between this particular remote device and the authenticating device. The remote device communicates this scale factor back to the authenticating device, such that the pool of candidate devices is narrowed to those remote devices that respond with a scale factor.

It is noted that the invention is not limited to use of a single triangle in steps 535-545, and any suitable number of largest triangles may be used with the invention. For example, step 535 may comprise determining and sending the three largest triangles that do not contain the same minutiae point. In such a situation, if the stored fingerprint in the remote device matches at least two of the three triangles, then the remote device may be considered a candidate remote device. Such use of more than one largest triangle minimizes the effects of a false read of the scanned fingerprint.

At step 550, the authenticating device transmits data regarding a plurality of unique circles to each remaining candidate remote device. In embodiments, the authenticating device sends data regarding ten unique circles, although any suitable number may be used. Circles for the scanned fingerprint are determined from the minutiae points determined in step 530. In embodiments each circle has a minutiae point at its center and a radius defined by a line between the center and a second minutiae point, such as the circles described above with respect to FIG. 4. A unique circle is defined as a circle that has an area that does not equal the area of any other circle of the fingerprint. The authenticating device determines the plurality of unique circles using mathematical operations.

At step 555, each candidate remote device that received the plurality of unique circles compares the unique circles to circles of the stored fingerprint. The scale factor is used to determine if the stored fingerprint has a plurality of circles that match the plurality of unique circles transmitted in step 550. In embodiments, if a candidate remote device does not have at least five circles that correspond in size (via scale factor) to five of the ten candidate unique circles, then that remote device excludes itself from the pool of candidates at step 542 by not responding to the authenticating device, or by responding that it is no longer a candidate for authentication.

On the other hand, each remote device that has at least five matching circles responds to the authenticating device at step 560 with a list of the five agreed upon circles. The invention is not limited to the use of ten candidate unique circles and five agreed upon unique circles, as described in this example; instead, any suitable number of candidate and matching unique circles may be used with the invention.

At step 565, the authenticating device transmits a triangle to the each remaining candidate remote device. The triangle is made from intersection points of the respective agreed upon unique circles. At step 570, the remote device compares the triangle to triangles formed from the agreed upon unique circles of the stored fingerprint. In embodiments, the comparison is based upon the area of the triangles and the previously determined scale factor; although any suitable geometric comparison may be used. If no match is found, then that remote device excludes itself from the pool of candidates at step 542 by not responding to the authenticating device, or by responding that it is no longer a candidate for authentication.

However, if a matching triangle is found, then at step 575 the remote device responds to the authenticating device that the triangle is a match. At step 577, the authenticating device determines if a threshold number of matches has been reached. In embodiments, the value of the threshold is three, meaning that three triangles must be matched before the fingerprint is authenticated. However, the invention is not limited to a threshold value of three; rather, the threshold may be set at any suitable number. For example, in embodiments, the threshold equals the total number of triangles that can be created from the intersection points of the agreed upon unique circles. If, at step 577, the threshold has not been reached, then the process returns to step 565 to determine and compare a new (e.g., different) triangle from the intersection points.

If, at step 577, the threshold has been reached, then at step 580 a pattern of a plurality of triangles created by the intersection points of the agreed upon unique circles is sent by the authentication device to the remote device. In embodiments, the pattern comprises all of the triangles created by the intersection points of the unique circles. At step 585, the remote device compares the pattern to a pattern created by a same number of triangles from the stored fingerprint. If the pattern does not match, then that remote device excludes itself from the pool of candidates at step 542 by not responding to the authenticating device, or by responding that it is no longer a candidate for authentication.

However, if the pattern matches, then at step 590 the fingerprint is deemed authenticated. In the example of a financial transaction, at step 595 the remote device may transmit credit card information and authorization to the authenticating device (e.g., POS terminal) to compete the transaction.

Figure 6:
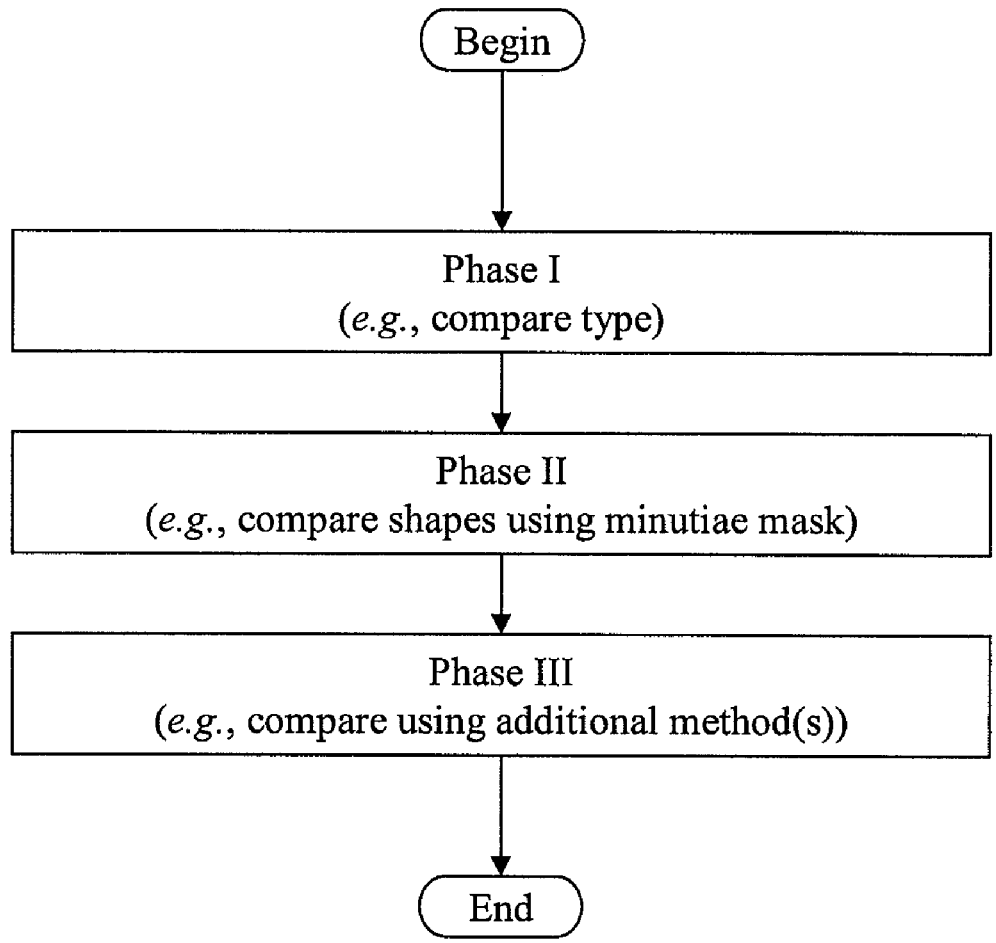

FIG. 6 shows a flow diagram depicting steps of a second method for authenticating fingerprints according to aspects of the invention. The implementation depicted in FIG. 6 adds additional layers of verification to the authentication process already depicted in FIG. 5. For example, step 610 corresponds to steps 505-525, and is referred to as Phase I. Similarly, step 615 corresponds to steps 530-590, and is referred to as Phase II.

Step 620, referred to as Phase III, comprises performing an authentication using the actual minutiae points, instead of the mask that is used in Phase II. For example, step 620 may comprise an authentication similar to that described in U.S. patent application Ser. No. 11/037,990, the disclosure of which is incorporated by referenced herein in its entirety. Additionally, or alternatively, step 620 may comprise a formal evaluation of the entire fingerprint by other conventional methods. In this manner, optional Phase III adds additional layers of trust to the authentication process.

While the invention has been described in terms of embodiments, those skilled in the art will recognize that the invention can be practiced with modifications and in the spirit and scope of the appended claims. For example, while the invention has been described with respect to fingerprint authentication for a financial transaction, the invention could alternatively be used for any type of fingerprint authentication. Moreover, the invention is not limited to wireless communications, and, instead, may be implemented with systems that employ other types of electronic communication.

What is claimed is:

1. A method of authenticating a fingerprint, comprising:
comparing a geometric shape of a scanned fingerprint to a corresponding geometric shape of a stored fingerprint,
wherein the geometric shape and the corresponding geometric shape are defined by vertices,
the vertices are defined by minutiae points,
the vertices are spaced apart from the minutiae points, and
the vertices comprise intersection points of intersecting circles and the circles are defined by the minutiae points.

2. The method of claim 1, wherein each of the intersecting circles comprises a center point defined by a first of the minutiae points and a radius defined by a line extending from the center point to a second of the minutiae points.

3. The method of claim 2, wherein the geometric shape and the corresponding geometric shape are triangles.

4. The method of claim 3, further comprising determining a scale factor before the comparing, wherein the comparing utilizes the scale factor.

5. A method of authenticating a fingerprint, comprising:
scanning a fingerprint;
determining minutiae points of the scanned fingerprint;
determining intersecting circles from the minutiae points of the scanned fingerprint;

creating at least one shape from intersection points of the intersecting circles; and transmitting the at least one shape to a device for comparison to a stored fingerprint.

6. The method of claim 5, wherein the at least one shape comprises a triangle.

7. The method of claim 5, wherein each of the intersecting circles comprises a center point defined by a first one of the minutiae points and a radius defined by a line extending from the center point to a second one of the minutiae points.

8. The method of claim 5, further comprising:
determining a type of the scanned fingerprint; and
transmitting the type to the device.

9. The method of claim 8, wherein the type is one of: arch, left or right loop, scar, tented arch, or whorl.

10. The method of claim 9, further comprising receiving a communication from the device that the stored fingerprint matches the type or does not match the type.

11. The method of claim 5, further comprising determining a scale factor which is used in the comparison to the stored fingerprint.

12. The method of claim 5, further comprising receiving authorization for a financial transaction based upon the comparison to the stored fingerprint.

13. The method of claim 12, wherein at least the scanning and the receiving are performed by a point of sale (POS) terminal.

14. The method of claim 12, wherein the financial transaction comprises a credit card transaction.

15. The method of claim 12, wherein the receiving authorization comprises receiving credit card data from the device.

16. The method of claim 12, wherein one of:
the device comprises a computing device arranged for wireless communication; and
the computing device comprises one of: a cell phone, a personal digital assistant (PDA), or a notebook computer.

17. The method of claim 12, wherein the transmitting and the receiving comprise wireless communication.

18. The method of claim 5, wherein one of:
at least one of the scanning, the determining minutiae points, the determining intersecting circles, the creating at least one shape, and the transmitting is provided by a service provider under a subscription and/or fee agreement and/or based on advertising content to one or more third parties; and a service provider at least one of creates, maintains, deploys and supports a computer infrastructure that performs at least one of the scanning, the determining minutiae points, the determining intersecting circles, the creating at least one shape, and the transmitting.

19. A method for authenticating a fingerprint for authorizing a financial transaction, comprising:
providing a computer infrastructure structured and arranged to:
scan a fingerprint;
determine minutiae points of the scanned fingerprint;
create a minutiae mask based upon the minutiae points;
create at least one shape from the minutiae mask; and
transmit the at least one shape to a device for comparison to a stored fingerprint.

20. The method of claim 19, wherein:
the minutiae mask comprises intersecting circles defined by the minutiae points, and
the at least one shape comprises triangles defined by intersecting points of the intersecting circles.

21. The method of claim 19, wherein the computer infrastructure is structured and arranged to transmit the at least one shape via wireless communication.

22. The method of claim 19, wherein the computer infrastructure is further operable to perform a financial transaction.

23. The method of claim 19, wherein the computer infrastructure is created, maintained, deployed, or supported by a service provider.

24. A computer program product comprising a computer usable medium having a computer readable program embodied in the medium, the computer usable medium being an apparatus that stores the program, wherein the computer readable program when executed on a computing device is operable to cause the computing device to:
scan a fingerprint;
determine minutiae points of the scanned fingerprint;
determine intersecting circles from the minutiae points of the scanned fingerprint;
create at least one shape from intersection points of the intersecting circles; and
transmit the at least one shape to a device for comparison to a stored fingerprint.

25. The method of claim 19, wherein the minutiae mask hides the minutiae points.

* * * * *